(12) United States Patent
Zarynow

(10) Patent No.: US 7,108,295 B1
(45) Date of Patent: Sep. 19, 2006

(54) FILAMENT-WOUND COMPOSITE COUPLING

(75) Inventor: John Zarynow, Phoenixville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

(21) Appl. No.: 10/781,005

(22) Filed: Feb. 18, 2004

(51) Int. Cl.
*F16L 37/00* (2006.01)

(52) U.S. Cl. ................................. 285/305; 285/294.1

(58) Field of Classification Search ............. 285/305, 285/222.1–222.5, 294.1, 294.2, 417, 369
See application file for complete search history.

(56) References Cited

U.S. PATENT DOCUMENTS

| | | | |
|---|---|---|---|
| 3,606,402 A | 9/1971 | Medney | |
| 3,606,403 A | 9/1971 | Medney | |
| 5,427,741 A * | 6/1995 | Bennett | 422/102 |
| 5,509,699 A | 4/1996 | Himmelberger | |
| 5,758,909 A * | 6/1998 | Dole et al. | 285/305 |
| 5,816,625 A | 10/1998 | Clark | |
| 5,837,181 A * | 11/1998 | Leimbacher et al. | 264/258 |
| 5,868,443 A * | 2/1999 | Ungerman et al. | 285/369 |
| 5,924,455 A | 7/1999 | Jo et al. | |
| 6,179,347 B1 * | 1/2001 | Dole et al. | 285/321 |
| 6,190,481 B1 | 2/2001 | Iida et al. | |
| 6,325,424 B1 | 12/2001 | Metcalfe et al. | |

* cited by examiner

*Primary Examiner*—Aaron Dunwoody
(74) *Attorney, Agent, or Firm*—Alexander H. Plache; Gregory F. Jacobs; Robert A. Elwell

(57) ABSTRACT

A filament-wound composite coupling for use in assembling a restrained joint between large diameter pipes with complementary retaining grooves, such as 16 inch or larger outer diameter polyvinyl chloride pipes. The coupling has first and second ends and ported retaining grooves associated with each end. Preferably, the coupling also includes O-ring seals and a pipe stop to index the pipes to be coupled. The composite coupling has a cylindrical composite body with a plurality of concentrically arranged layers of wound filaments in a thermoset plastic matrix. Each of the layers is characterized by a winding angle opposing the winding angle of the adjoining layers.

22 Claims, 9 Drawing Sheets

FILAMENT-WOUND COMPOSITE COUPLING

BACKGROUND OF INVENTION

The present invention relates to a non-metallic connecting device for pipes conducting pressure medium, the non-metallic connecting device being characterized by the capacity to accept an insertable and separable insert to restrain a pipe end within the connecting device, and in particular, the present invention relates to a filament-wound composite connecting device for preparing a restrained joint between large diameter pipes conducting pressure medium.

Potable water is distributed at the lowest cost per mass of any commodity. Traditional water distribution systems employed large diameter metallic pipes interconnected by joints featuring complex metallic couplings. Traditional metallic pipes are subject to corrosion from some potable waters. Metallic couplings are also subject to failures, not just from corrosion but also from mechanical failure in response to both radially and axially directed forces. Such joint disrupting forces originate in frequent and occasionally substantial fluctuations in pressure and/or water flow. Traditional metallic coupled joints are often supported against separation or movement by association with strategically arranged masses of concrete. The concrete masses restrain the metallic coupled joints to counter and resist undesirable shifts that might cause a joint to mechanically fail. Preparation of each metallically coupled joint along with the often required concrete mass restraining the mechanically coupled joint is particularly problematic. Traditional water distribution systems are increasingly viewed as needing a fresh look with respect to efficiency, durability, capital cost and ease of installation and maintenance.

Modern materials are now being substituted for the metallic pipes and metallic mechanical couplings in many water distribution systems. Plastic pipes are not subject to corrosion. Joining plastic pipes, however, remains a challenge. In particular, plastics often have a slick or slippery surface relative to surfaces on metallic materials. Polyvinyl chloride (PVC) and polyethylene (PE) are two plastic materials particularly considered feasible as pipe materials for large diameter pipes. Each of these materials, however, comes with its own challenges in being acceptable as a large diameter pipe material. As will be explained, these challenges often involve difficulties in joining pipes to form a distribution system.

Large diameter pipes systems of PE, and in particular, high density polyethylene (HDPE), are able to function at 200 psi and, therefore, tend to dominate the plastic high pressure water system market. However, HDPE large diameter pipes are relatively expensive. Moreover, connecting two HDPE large diameter pipes is both costly and time consuming. Each HDPE joint requires performing a fusion welding process. The fusion welding process requires about an hour to complete each joint and further requires the on-site presence of both significant large equipment and skilled labor. Providing sufficient working space about the joint while performing fusion welding is yet another concern. Attempts to substitute unskilled labor can result in defective fusion HDPE joints characterized by unacceptable axial tensile strength.

PVC pipe is relatively less expensive than HDPE pipe. As such, it might initially seem an excellent choice for a distribution system. The challenges of PVC pipe distribution systems can be readily understood by considering a 16 inch diameter PVC pipe system, exemplary of a large diameter pipe system. Currently available PVC 16 inch diameter pipes are capable of containing and operating at pressures of 200 psi. Currently available PVC 16 inch diameter water distribution systems, however, are operated at only 90 psi due to the limited pressure rating of the current PVC pipe couplings used in preparing joints between PVC pipes. The inventor has investigated extensively and discovered poor pressure performance of the current PVC pipe couplings relates to failure to withstand the hoop stresses associated with higher pressures, such as in the ASTM D2241 qualification test. Susceptibility to high pressure might be caused by insufficient wall thickness of the couplings about the internal O-ring grooves. That is, each currently available PVC coupling includes a pair of internal O-rings and a groove holding each O-ring. When part of a joint, the internal portion of the PVC coupling between the O-rings is subject to system pressure. System pressure acts upon this internal portion to radially expand a hoop shaped portion of the PVC coupling adjacent to each of the O-ring grooves. As higher system pressures further expand the PVC coupling adjacent to the O-rings, a leak occurs at one of the two O-rings. Such an undesired expansion thereby results in a water distribution system failure and, therefore, is the cause of the lower 90 psi pressure limitation.

Current 16 inch PVC couplings are typically manufactured via a two-step process. The first step of the process entails extruding a thick walled PVC billet (i.e. a thick walled hollow cylinder). A pipe stop, O-ring grooves, and spline grooves are then machined internally from the cylindrical billet to produce a finished PVC coupling. Because of the design of the coupling, the central pipe stop for a 16" pipe must remain after machining away PVC material from the total starting thickness of the billet. The remaining wall thickness of the finished coupling after machining is only 0.635 inches. The O-ring groove depth cut into this 0.635 inch wall is 0.295 inches. This leaves a wall thickness of only about 0.34 inches between the O-ring groove location and exterior surface of the cylindrical coupling. As noted above, this thickness is insufficient to resist system failure at 200 psi.

The inventor investigated further by experimenting with a number of apparently simple solutions in an attempt to discover a more pressure resistant PVC coupling for PVC pipe. The desired new PVC coupling would allow the 200 psi high pressure capacity of PVC 16 inch pipe to be exploited rather than settling for a distribution system derated to 90 psi. For example, a simple solution might seem to be manufacturing a PVC coupling having sufficient wall thickness to withstand the hoop stresses generated in the ASTM D2241 testing. However, the starting wall thickness of the necessary billet would need to be 2 inches or greater for such a simple solution. One constraint that should also be noted is that only certain PVC extrusion mixtures have regulatory approval for potable water service. Initial experiments based upon extruding a billet with a 2 inch wall thickness, for an experimental 12 inch diameter PVC coupling of an approved extrusion mixture, necessitates that residence time of the PVC material in an extruder increase to a duration time that results in scorching or burning of the PVC resin in the resulting experimental billet. Such scorching or burning unacceptably degrades the physical properties of the PVC material. Moreover, it is thought that excessively thick extrusions fail to achieve a desirable level of "fusion" and thus are plagued by insufficient strength. It was concluded that an experimental coupling prepared from an approved PVC mixture as a billet with 2 inch thick walls of degraded PVC material would not pass the performance tests indicated in ASTM D2241 and would not yeild a water distribution system having the desired performance reliability.

Another attempted simple solution might seem to be providing additional reinforcement to current PVC couplings. Prior attempts to constrain the above-mentioned radial expansion in current PVC couplings with supplemental bands or rings of appropriately situated fiberglass reinforcement have failed due to underlying expansion and eventual bursting of the underlying PVC adjacent an O-ring groove when tested at appropriate internal pressure. The inventor concluded that the desired PVC based coupling was not the correct approach and began to explore other coupling materials.

Yet another simple solution might seem to be available by reinforcing current HDPE pipe couplings by supplemental filament winding layers over a HDPE pipe coupling. However, experimental reinforced HDPE couplings demonstrated unacceptable axial tensile strength, presumably due to the inherent poor compressive strength of HDPE. This approach was discarded after observing that a vertical face of a spline groove in the HDPE pipe coupling had sheared out in response to axial stress.

Still another simple solution involved compression molding two halves of a glass-filled polypropylene liner, butt welding the two halves of the liner together and then filament winding layers of Twintex® glass fiber roving over the newly-formed liner for added hoop strength. The butt welding of the two halves proved to be not feasible as glass fibers migrated to the surface edge during the heating operation. The presence of the glass made it impossible to form a leak proof bond in the butt welded coupling.

Another approach involved compression molding of Owens Corning Azdel® composite material as a liner and bladder molding Twintex® fabric around the liner for greater hoop strength. This approach failed because good consolidation was not achieved and water migration through the coupling wall was observed during hydrostatic testing.

Yet another approach involved winding 60% Twintex® glass roving into a hollow cylinders and subsequently machining internal grooves for splines and O-ring. This approach failed because of water permeation through the walls of the experimental couplings. The water permeation was interpreted as the interior surface of the experimental coupling becoming resin starved during consolidation of the Twintex® rovings. Furthermore, in addition to the unacceptable water permeation characteristic, machining of the spline and O-ring grooves proved a challenge and, when finally machined and tested, the experimental couplings still tended to split circumferentially.

Tubular items of composite prepared by filament winding processes have been used in very limited situations as pipe systems. In U.S. Pat. No. 3,606,402, Medney discloses precision machined male and female integral ends on filament wound pipe lengths being mated and locked by insertion of paired keys into a locking groove. In U.S. Pat. No. 3,606,403, Medney discloses an adhesive joint of male and female integral ends on filament wound pipe lengths. Such joining arrangements require that the pipes themselves are filament wound and do not take advantage of the more economical PVC pipes.

Clearly, an improved coupling for PVC pipe was still needed and a simple solution did not appear available. The inventor then discovered a more elegant and sophisticated solution, explained subsequently herein. The present invention addresses and overcomes the deficiencies of the current PVC coupling, allowing greater internal pressure without failure. This in turn allows for more efficient use of the high pressure capabilities of large diameter PVC pipe. Additionally, the present invention is less expensive and time consuming than current HDPE joint preparation by fusion welding. Moreover, a joint assembled with the present invention allows some unexpected new applications of PVC pipe. Further, the present invention enables large diameter PVC pipe water distribution systems having improved systems reliability.

SUMMARY OF INVENTION

In a first embodiment, the present invention is a composite coupling for use in assembling a restrained joint between pipes having pipe ends and external complementary retaining grooves axially spaced from the pipe ends. The invention is particularly useful in forming a joint between PVC pipes of large diameter. The invention may be understood by considering 16 inch PVC pipes and especially may be understood in terms of couplings for 16 inch PVC pipes to be coupled and assembled into a restrained joint, the couplings for which have an outer diameter of about 17.4 inches.

The composite coupling includes a cylindrical composite body, with a retainer grooves and ports communicating with the retainer grooves. More specifically, the cylindrical composite body defines an axis and has a first end, a second end, an exterior surface and an interior surface. The first retainer groove is in the interior of the coupling and axially spaced from the first end. The second retainer groove is also in the interior of the coupling and axially spaced from the second end. Ports communicate between the exterior surface and the retainer grooves. The cylindrical composite body is formed of a plurality of concentrically arranged layers of wound filaments in a thermoset plastic matrix, each of the layers characterized by a winding angle opposing the winding angle of the adjoining layers. The coupling preferably also includes means for sealing pipes to be joined to maintain a pressurized flow between the pipes through the restrained joint. Preferably this means for sealing includes O-rings. Preferably, the seal between each pipe and the interior surface of the coupling includes an O-ring. Preferably, the coupling also includes means to index a pipe end so as to position a complementary retainer groove near the pipe end coincident with the first retainer groove. More preferably, the means to index appropriately positions both pipes within the coupling and involves either an integral or unitary radially inwardly directed extension from the interior surface or a snap ring bonded into position. The pipe ends abut such means for indexing to positionally index the complementary retainer grooves coincident to the retainer grooves, by limiting the depth of insertion of the pipe into the end of the composite coupling. The integral pipe stop is preferably symmetric about the axis and is a unitary part of the cylindrical composite body. The snap ring may include a longitudinal cut or gap to allow it to be compressed and then resiliently expand. The ports initiate either a clockwise or counter-clockwise pathway into respective retainer grooves. This feature, in turn, allows the coupling to be reversible while maintaining the pathway orientation for one approaching from an end of the coupling.

The useful winding angles are from +40 degrees to +65 degrees and the opposing winding angles are from −40 degrees to −65 degrees. Preferably, the filaments in a first layer of the composite are disposed upon a winding angle of about +55 degrees relative to a cylindrical axis of the body. Preferably, the filaments in a second layer wound over the first layer are disposed upon a winding angle of about −55 degrees relative to the cylindrical axis. Preferably, filaments in a third layer, wound over the second layer are disposed upon a winding angle of about +55 degrees relative to the cylindrical axis. In this way, windings of each layer oppose the windings of the previous layer and an immediate overlying layer, if present. Preferably, the coupling has at least five layers of opposing windings, more preferably the coupling has 7 layers of opposing windings or 10 layers of opposing windings for very highly demanding applications. The preferred filaments are glass filaments; more preferably E-glass roving. The thermoset matrix is preferably epoxy.

In another embodiment, the invention is a receiver useful for forming a restrained connection, much like one half of a restrained joint, to a pipe, especially a large diameter PVC pipe, having a pipe end and a complementary retainer groove spaced from the pipe end. The complementary retainer groove is adapted for receiving a portion of a flexible spline. The receiver includes a tubular body, an O-ring groove, a retainer groove and port communicating with the retainer groove. The tubular body is made of composite material and has at least one end, an interior and an exterior, and defines a longitudinal receiver axis. The O-ring groove is in the interior surface and spaced axially from the at least one end. The retainer groove is in the interior between the at least one end and the O-ring groove. The port communicates between the retainer groove and the exterior. The composite material includes a plurality of layers of wound filament in a thermoset plastic matrix, and wherein successive layers of the plurality of layers have alternating winding angles.

In another embodiment, the present invention is a restrained joint pipe coupling of composite material. More preferably, the composite material is a multi-layered arrangement with each layer including angle-wound filaments in a thermoset matrix and successive layers having filaments of wound in opposing angles. Most preferably, at least five layers are present. More preferably there are seven to ten alternating layers to form a stronger coupling. Most preferably, the angle of winding is about 55° relative to the axis of the coupling and each successive layer alternating +55° and −55° relative to the axis of the coupling.

Thermoset polymeric materials are preferred such as, for example, Bisphenol A based epoxy resins, though other resins could be used. Preferably the filament is an E glass continuous fiber. The preferred angle of the winding is plus or minus 55 degrees in alternating wraps or layers. The winding can alternatively incorporate a braiding structure in its lay-up. Preferably there are at least five layers of fiber winding.

This composite restrained joint pipe coupling overcomes shortcomings of current conventional couplings for larger diameter PVC pipes in pressurized systems. Further, the composite restrained joint pipe coupling allows substantially improved rates of assembly relative to the typical one hour fusion welding processes used to form HDPE joints. Moreover, beside faster assembly than fusion welding processes, the composite restrained joint pipe coupling provides a relatively greater axial tensile strength than a fusion welded HDPE joint. In particular, whereas fusion welded joints of HDPE require on the order of one hour to complete, joints may be assembled between two pipes with the composite coupling of the present invention in less than 15 minutes, preferably less than 10 minutes and most preferably in from about 5 to about 7 minutes. Further, the composite coupling of the present invention, used with appropriate PVC pipes, can be used to assemble joints safely rated for internal pressures of 160 psi in 16 inch pipe systems. Preferably, such PVC pipe and composite coupling joint systems can be used at pressures of 200 psi or more.

The present invention is also a method of forming a coupling and a method of forming a restrained joint. The composite restrained joint pipe coupling is fabricated by a filament winding process that utilizes thermoset materials. The material from which the coupling is manufactured is a bis-phenol A based epoxy resin and E glass. The filament is applied successively over a rotating mandrel with alternating +/−55 degree winding angles, as measured relative to the axle or axis of rotation of the mandrel. After curing, one or more segments are obtained with each segment available to be used as a body of the coupling. Subsequently, O-ring and restraining or spline grooves are machined into the segment of cured composite pipe coupling. An indexing means, such as an integral pipe stop may also be machined into the composite. Alternatively, a snap ring is bonded into an appropriate position in the segment. If a snap ring is to be employed, a snap ring groove may also be machined into the interior surface to facilitate positioning and holding of the snap ring during bonding. A port is drilled or bored from the exterior to the retaining groove to provide communication with each retaining or spline groove. Preferably, the port is tangent to the retainer groove and most preferably oriented to initiate a clockwise or counter-clockwise path into the retainer groove, relative to the associated end of the coupling. O-rings are installed in the O-ring grooves. The composite restrained joint pipe coupling is secured to an inserted end of a suitable complementary pipe, preferably a PVC pipe, by insertion of a flexible spline through the port and into the retaining or spline groove. Again, preferably, the flexible spline insertion is consistent with orientation of the port. It should be understood that the retaining or spline grooves can be circumferential or helical or other variants of such shapes provided that they encircle, at least partially, the axis of the coupling and have matching complementary retaining grooves on the pipe with which they may be made coincident so as to form a pathway for a spline. However, circumferential grooves are generally preferred over helical and other encircling or partially encircling variants when axial strength is required. Non-circumferential variants, such as helical grooves, are employed when torque resistance is required and are primarily considered a trade-off in that axial strength is partially sacrificed in such variants.

In another embodiment, the present invention is a nonmetallic corrosion resistant coupling restrained joint including large diameter PVC pipes and couplings of filament wound fiber reinforced thermoset composites. The restrained joint pipe coupling joints also overcome the problems of conventional coupling joints for larger diameter PVC pipes in pressurized systems and are assembled with improved rates of assembly over fusion welding processes and are joints characterized by improved axial tensile strength.

The invention is also a pipe system using large diameter PVC pipe including at least one, and preferably a plurality of restrained joints, each of the joints having a non-metallic corrosion resistant coupling made from a filament wound fiber reinforced thermoset composite.

The present invention is also a method of producing a coupling for forming a restrained joint for large diameter PVC pipe having non-metallic corrosion resistant coupling made from a filament wound fiber reinforced thermoset composite. In the method, a pipe coupling is fabricated using a filament winding processes from thermoset polymeric materials and glass fibers. The filament winding includes a plurality of alternating windings at angles of plus(+) and minus(−)55 degrees relative to the axis of winding. O-ring and spline grooves are provided within the composite pipe coupling. The pipe coupling resulting from the method, when assembled into a pipe joint, has improved burst strength under pressurized fluid flow and improved axial tensile strength. The pipe coupling enables the use of larger diameter PVC pipes with pressurized fluid flows. The coupling is secured to the pipe by inserting a flexible spline into a port to engage both a retainer groove of the coupling and a complementary retainer groove on a pipe indexed within the coupling. The coupling is re-deployable, allowing a joint to be first assembled, then disassembled by removal of the flexible spline. When re-deployed, the same coupling need not be used to form a joint between the same two pipes, but rather alternate pipes or couplings from a plurality of each might be selected for forming new joints. The coupling is also reversible in a preferred embodiment.

DETAILED DESCRIPTION

By "large diameter pipe" herein is primarily meant pipes of 16 inches OD or greater. Two preferred pipes, useful in practicing several aspects of the present invention, are available from Certainteed Corporation, Valley Forge, Pa. as C905/RJ™ DR25 (part number 29128) and C905/RJ™ DR18 (part number 29127) Restrained Joint PVC Pipe, which are both 20 foot polyvinyl chloride pipes of about 17.4 inch outer diameter with a complementary retaining groove located about 3.610 inches from each end of the pipes and thus capable of use with the Certa-Lok™ Restrained Joint system of CertainTeed Corporation. Another preferred pipe is Certa-Lok™ Well Casing pipe which is a 20 foot PVC pipe having an outside diameter of about 16 inches, also available from CertainTeed Corporation. Use of these preferred pipes with fiber-wound composite couplings of the present invention typically and preferably requires a 0.375 by 0.625 rectangular cross-section nylon spline of about 58 inches in length (Certain-Teed Corporation's part number 86533.) The filament-wound composite coupling sizes contemplated for use with the preferred pipes are 17.434 inch inner diameter and 18.264 inch outer diameter (for a ten layer thicker wall embodiment) and 17.434 inch inner diameter and 18.024 inch outer diameter (seven layer thinner wall embodiment). Both these embodiments of filament-wound composite couplings use a spline of 0.375 inch by 0.625 inch cross section and about 58 inches in length.

The Composite Coupling and Preparing Joints with the Composite Coupling.

Figure 1:
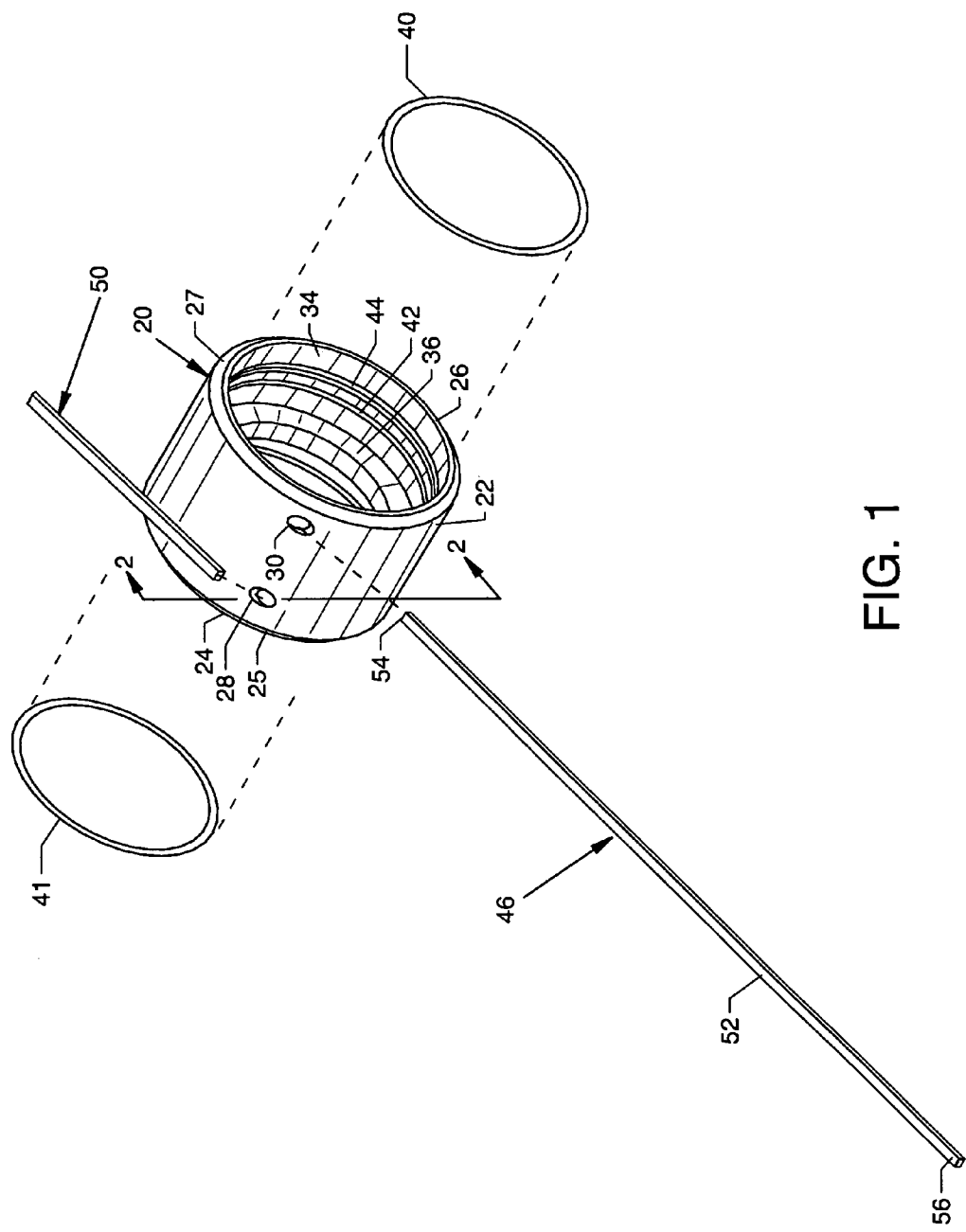
FIG. 1 shows an exploded isometric view of a preferred embodiment of the present invention.

As shown in FIG. 1, a first embodiment of the present invention is a coupling 20, shown in FIG. 1, for joining ends 37 and 62 of pipes 39 and 60, respectively, as shown subsequently in FIG. 3, so as to form or assemble a restrained joint. The coupling 20 is primarily composed of a specialized composite material, as will be discussed subsequently. The coupling 20 is tubular in shape and in particular is generally cylindrical in shape. The coupling 20 has an exterior surface 22, a first end 24, and a second end 26. A bevel 25 and 27 is present on each end 24 and 26, respectively. Ports 28 and 30 are visible on the exterior surface 22.

Figure 2:
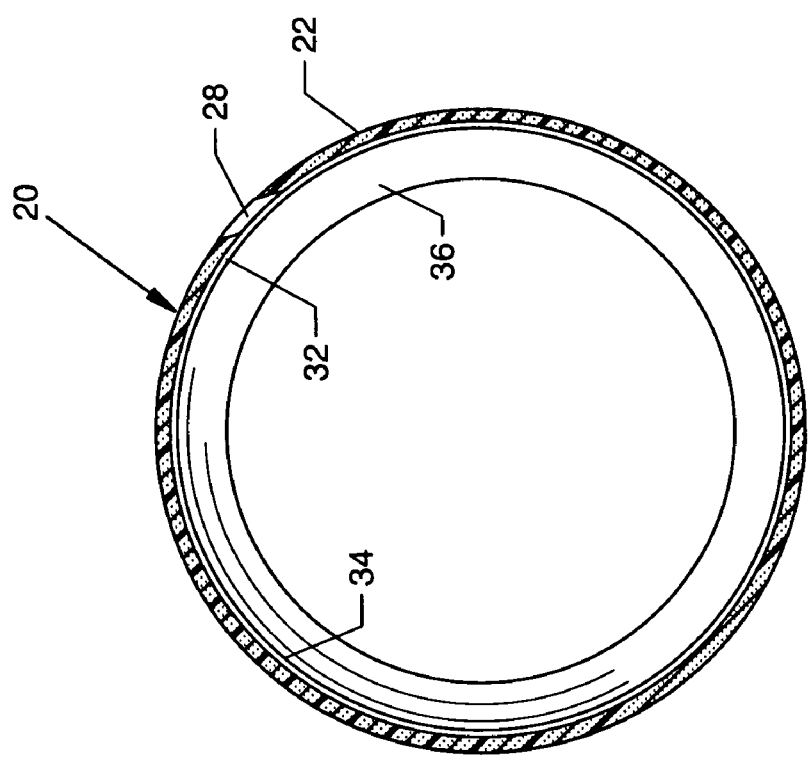
FIG. 2 shows a cross-sectional view at line 2—2 of FIG. 1, passing through port 28 and with stippling indicating wound-filaments within a thermoset plastic.

Port 28 leads to and communicates with a retainer groove 32 at the interior surface 34 of the coupling 20, as shown in the cross-sectional view of FIG. 2. Preferably, the port 28 is directed such that it is tangential to the retainer groove 32. Most preferably, the port 28 initiates a clockwise (shown) or counter-clockwise (not-shown) pathway into groove 32 from the perspective of one viewing the coupling 20 from end 24. The preferred port 28 is cylindrically shaped, such as would result from drilling or boring to generate the cylindrical shape. Also note that the entrance to ports 28 and 30 on the exterior surface of coupling 20 appears as an elongated oval, as in FIG. 1, an appearance generated by the cylindrical shape of ports 28 and 30 intersecting the cylindrical surface 22 of the coupling 20 at an off-axis orientation. Preferably, the off-axis orientation of the ports 28 and 30 is tangential to retainer grooves 32 and 44, respectively. Preferably, the ports 28 and 30 are about 0.75 inches in diameter.

The retainer groove 32 in this embodiment is circumferentially arranged and extends radially outward from the interior surface 34 of the coupling 20. The preferred cross-sectional dimensions of retainer groove 32 are from about 0.625 inches to about 0.8 inches, preferably, 0.75 inches, longitudinally and about 0.20 inches in the radial direction. The preferred distance from the end 24 to the retaining groove 32 is about 2.5 inches. Preferably, there is a small amount of space in both the longitudinal and radial direction between the spline and the coincident spaces which accommodate the spline; preferably such excess space are on the order of about 0.02–0.04 inches of radial excess space and on the order of about 0.1–0.2 inches of excess longitudinal space.

A pipe stop or internal stop 36 is also shown in FIG. 2. The preferred pipe stop 36 has dimensions of from about 1.400 inches to about 2.130 inches longitudinally and extends radially inward from the interior surface 34 about 0.8 inches. Preferably, pipe stop 36 indexes pipes to be coupled but most preferably does not extend radially inward substantially past the inner diameter of pipes so as to avoid interfering with the flow of water through a restrained joint formed between pipes 39 and 60 with the coupling 20. Preferably, the coupling 20 is symmetrical about the pipe stop 36.

Figure 3A:
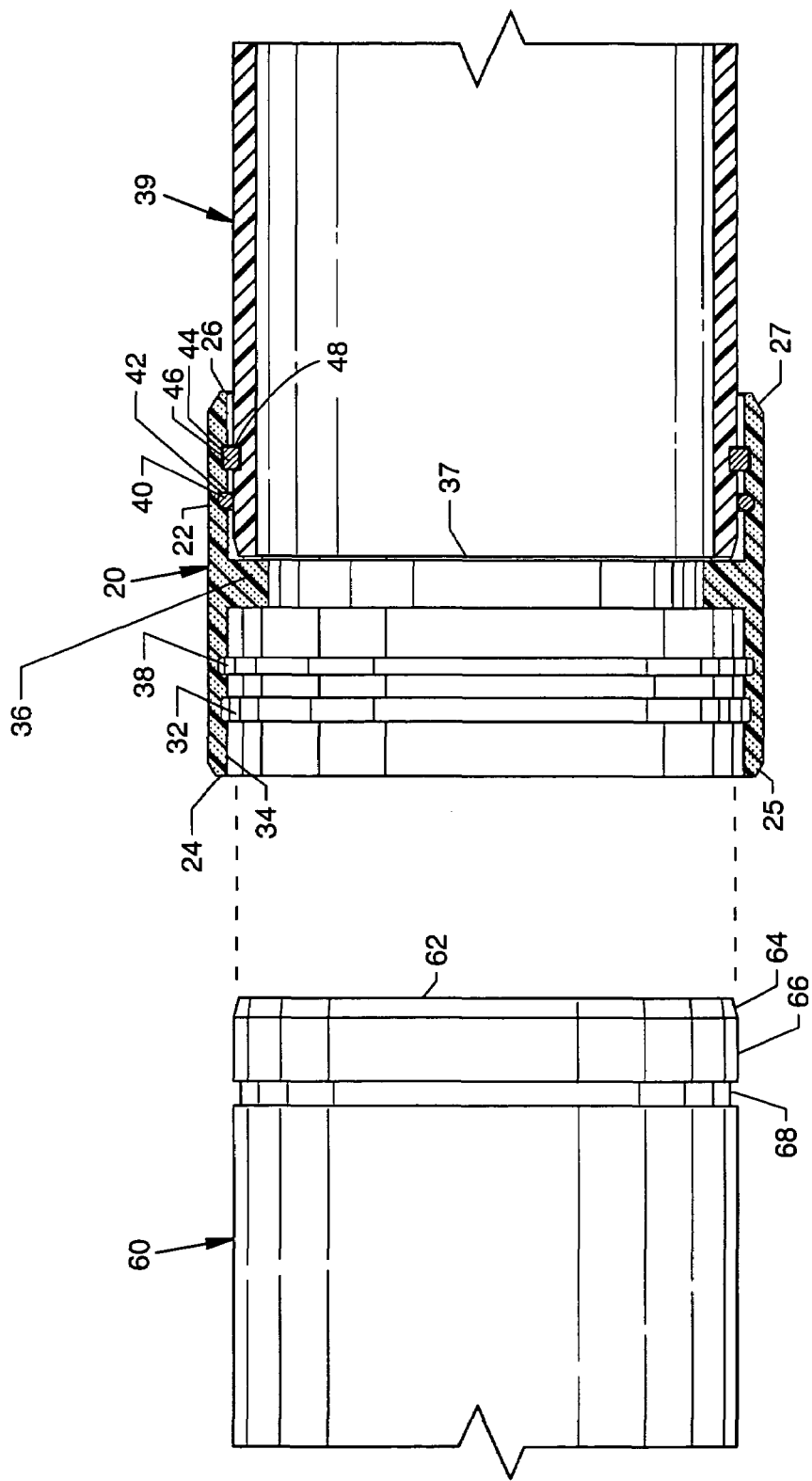
FIG. 3a shows a vertical cross-sectional view through coupling 20, with stippling indicating wound-filaments within a thermoset plastic, and through fragmentary pipe 39 as restrained by flexible spline 48 and prior to insertion of pipe 60.

As shown in the vertical cross-sectional view in FIG. 3a, the pipe stop or internal stop 36 is roughly equally distant from and between retainer groove 32 and retainer groove 44. Retainer groove 44 is in communication with the exterior surface 22 via port 30. Preferably, retainer groove 44 has dimensions identical to retainer groove 32. Preferably, port 30 is tangentially oriented relative retainer groove 44 and most preferably initiates a clockwise or counter-clockwise pathway into retainer groove 44 from the perspective of one situated at end 26 of coupling 20. Preferably, port 30 is drilled or bored with a diameter of about 0.75 inches. As with port 28, the appearance of the port 30 maybe elongated due to the intersection of the cylindrical bore of port 30 with the cylindrical exterior surface 22 of the coupling 20. Most preferably, the ports 28 and 30 are co-aligned on the exterior surface 22.

The co-aligned relationship between ports 28 and 30 facilitates quick installation of the composite coupling 20 during formation of a restrained joint since situating a first port in a convenient orientation will also typically automatically orient the second port 30 in a similarly convenient orientation. The efficiency afforded by such a feature may be particularly appreciated when considering that restrained joints are often assembled within the confines of a trench with shored walls where providing sufficient working space for joint assembly is both expensive and time consuming. Moreover, the similar handed orientation of the ports 28 and 30 relative to each end 24 and 26, respectively, also serves to facilitate installation, since port 28 and 30 will always be directed to initiate a clockwise or counter-clockwise pathway into its respective restraining groove 32 or 44. Preferably, whether clockwise or counter-clockwise, the pathways of the ports 28 and 30 are similarly handed for a given coupling. That is, the preferable pathways are either both clockwise or both counter-clockwise for a given coupling. The efficiency and convenience of such a feature again is apparent when considered from the viewpoint of a utility worker in a rather confined shored trench. The equal distance relationship of both retainer grooves 32 and 44 from the pipe stop 36 allows the coupling 20 to be installed either direction (i.e. reversed with respect to pipes 39 and 60.) Again, this represents yet another convenience feature facilitating retrained joint assembly in the tight confines of a shored trench.

Moreover, the equal distance relationship between retainer groove 32 and 44 is reflected anew in complementary retainer grooves present in pipes, preferably PVC pipes, suitable for joining or connecting by composite coupling 20. That is, the coupling 20 is preferably intended for use in joining at least a pair of pipes, each of the pipes of the pair having ends with complementary retainer grooves 48 and 68 and with a standard spacing of the complementary retainer grooves from the ends of the pipes. Preferably, the coupling 20 is one of a plurality of like-dimensioned couplings used to assemble a plurality of like-dimensioned pipes into an extensive pipe system. As noted previously, PVC pipe in twenty foot lengths with appropriate complementary retainer grooves is available from Certainteed Corporation, Valley Forge, Pa. as C905/RJ™ DR25 (part number 29128) and C905/RJ™ DR18 (part number 29127) Restrained Joint PVC Pipe. While the instant invention is known to perform well with PVC pipes, pipes made from other materials may be useful for pipe systems, including the filament-wound composite coupling of the present invention, suitable for service in higher temperature and/or corrosive environments. Engineering resins may be used in such pipe systems such as resins based on polyphenylene sulfide, Nylon, Acetal, PEEK, PEKK, polysulfone and the like. Glass filled polypropylenes or Nylons may also be used.

An O-ring groove 38 is present between the pipe stop 36 and the retainer groove 32. Though shown without an O-ring in FIG. 3a, it should be understood that the O-ring groove 38 would normally carry an O-ring 41. The O-ring groove 38 is capable of holding O-ring 41 when the coupling 20 is not in use, holding an O-ring while a pipe 60 is being inserted, holding an O-ring in a sealing arrangement between the O-ring groove and a pipe 60 when a pipe is participating in joint, and holding an O-ring while a coupled joint is being disassembled. A second O-ring groove 42 is present between the pipe stop 36 and the retainer groove 44. An O-ring 40 is shown in O-ring groove 42 in a sealing relationship with pipe 39.

As will be discussed subsequently, the region of the coupling 20 adjacent to O-ring grooves 38 and 42 is strengthened and reinforced by the presence and arrangement of composite material thereby resisting or avoiding undesired hoop expansion by internal pressure forces. Coupling 20, therefore, is in significant contrast to the known coupling of PVC material that suffers from undesired hoop expansion by internal pressure and therefore limits its use to lower pressure situations. Also, the presence and arrangement of composite material strengthens and reinforces the coupling 20 adjacent to the retainer grooves 32 and 44, thereby resisting or avoiding failure due to axial tension. Increased resistance to axial tension is also in significant contrast to the known coupling of PVC material which can fail due to axial tension and, therefore, would likely require concrete mass restraint were it capable of resisting hoop expansion at high pressure. The increase in axial tension resistance of coupling 20 allows for new uses of large PVC pipe systems.

Figure 3B:
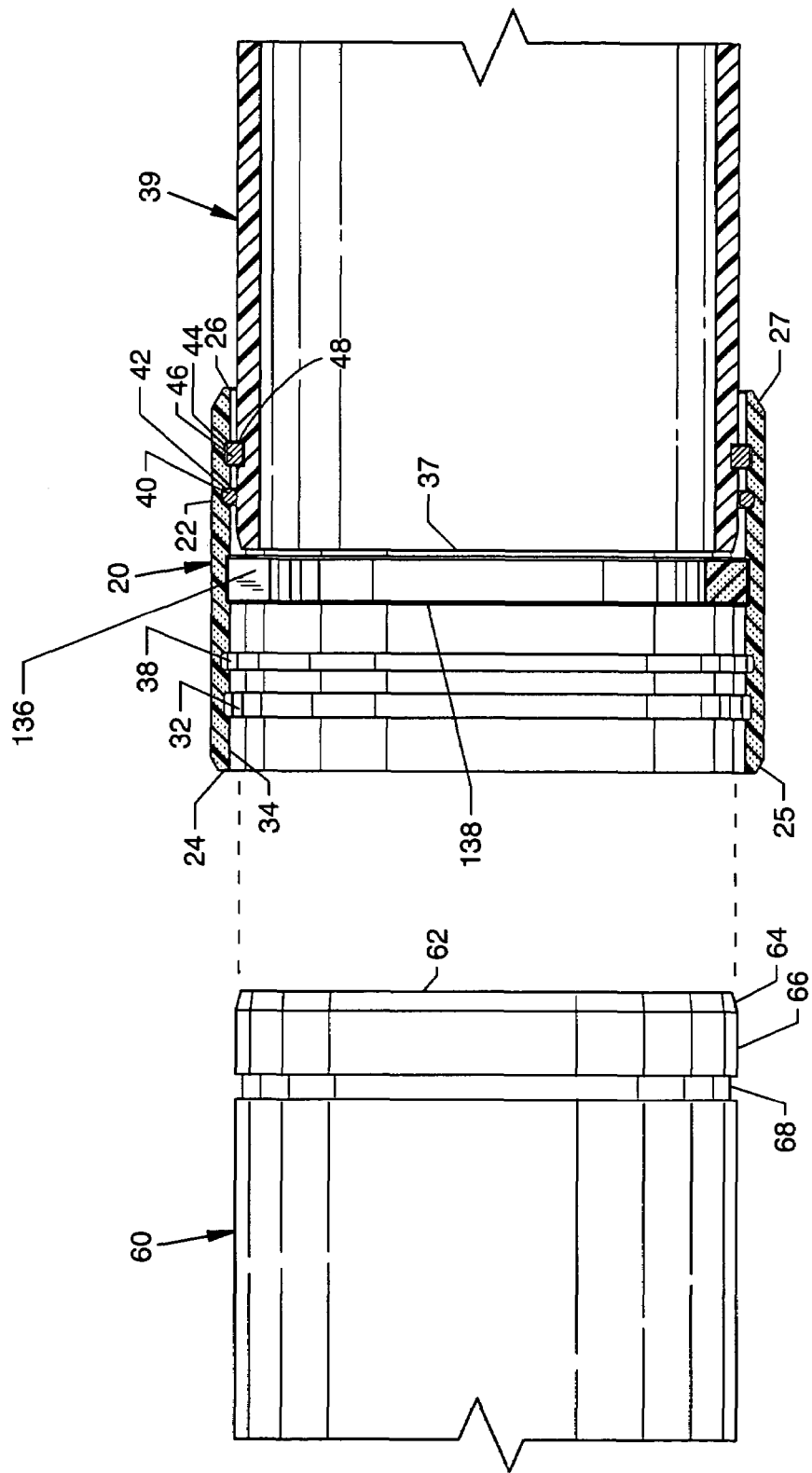
FIG. 3b shows a vertical cross-sectional view through an alternative embodiment of the present invention, with stippling indicating wound-filaments within a thermoset plastic resin, and through fragmentary pipe 39 as restrained by flexible spline 48 and prior to insertion of fragmentary pipe 60.

FIGS. 1, 3a and 3b also show a flexible spline 46. Flexible spline 46 occupies retainer groove 44 of coupling 20 as well as occupying complementary retainer groove 48 of pipe 39. Flexible spline 46 preferably generally encircles pipe 39 in the circumferential groove 44 and, optionally, a portion of flexible spline 46 may protrude from port 30. Preferably, the flexible splines 46 and 50 have rectangular cross-sections with dimensions of about 0.375 inches in the radial dimension and 0.625 in the longitudinal direction and for a 16 inch pipe are about 58 inches in length. Preferably, the flexible splines 46 and 50 are formed of Nylon, most especially Nylon 66. Satisfactory splines may also be formed from other flexible non-corrosive materials such as, for example, thermoplastic urethanes. Nylon splines of these dimensions are available from Certainteed Corporation, Valley Forge, Pa. for use with the Certa-Lok™ Restrained Joint system of CertainTeed Corporation (part number 86533.) Splines are also available from Victaulic of Easton, Pa. under the Aquamine trade name.

This assembly of pipe 39 to coupling 20 was generated as follows: end 37 of pipe 39 was inserted, past O-ring 40, to a positional relationship abutting pipe stop 36. Such indexing aligned complementary retainer groove 48 of pipe 39 with retainer groove 44 of the coupling 20. Flexible spline 46 then was inserted through port 30 and into aligned grooves 44 and 48. The assembled joint between pipe 39 and composite coupling 20 resists axial tension forces due to the presence of flexible spline 46 resisting axial forces by bearing against retainer groove 44 and complementary retainer groove 48. To separate the pipe 39 from the coupling 20 in this assemble would require shearing of the flexible spline 46 or failure of the material at retainer groove 44 or complementary retainer groove 48. Due to the presence and arrangement of composite material in the coupling 20, however, failure or yielding of materials at retainer groove 44 is substantially resisted or reduced.

In FIG. 3a, pipe 60 is shown separated from the coupling 20 and axially aligned as would allow insertion (or as would result from disassembly.) As with pipe 39, insertion of axially aligned pipe 60 into coupling 20, past O-ring groove 38 and into an abutting relationship with pipe stop 36 indexes the complementary retaining groove 68 with retaining groove 32. If an O-ring 41 were present in O-ring groove 38, then a sealed relationship would be established between the pipe exterior surface 66 and the interior surface 34 of the coupling 20. Note that, preferably, an outer bevel 64 is present on the pipe 60 at end 62. This bevel 64 or frustaconical surface facilitates initiation of insertion by promoting final minor correction to establish coaxial alignment of the pipe 60 with the coupling 20. Optionally, an interior edge bevel (not shown) could be provided on the coupling 20 at end 24 to serve a similar function or to supplement the function of bevel 64. However, bevel 64 additionally serves to protect O-ring 41 when present at O-ring groove 38 as the end 64 of pipe 60 is inserted. Preferably, bevel 64 is angled about 15° relative to the axis of pipe 60 and has a surface length of about ⅝ inch.

Once the indexed relationship between pipe 60 and coupling 20 has been established, the retainer groove 32 and the complementary retainer groove 68 of pipe 60 align or coincide to form and define a flexible spline accepting circumferential space with communication to the exterior surface 22 through port 28. Note again that the pathway into this space is initiated in a clockwise or counter-clockwise manner, relative to one viewing from end 24 of coupling 20. Flexible spline 46, previously shown in FIG. 1, has a spline head 54, a flexible spline body 52 and a spline end or tail 56. Flexible spline 50 preferably is identical to flexible spline 46 and also has a spline head, spline body and spline end or tail. Flexible spline 50 may then be inserted by placing the spline head into port 28 and continuing to feed flexible spline body into the port 28. The spline head first follows port 28 then deflects to follow the coincident spline accepting space in a clockwise or counter-clockwise direction relative to end 24. The flexible spline may be fed and inserted until the head reaches and contacts the spline body adjacent the port 28 after encircling pipe 60 at complementary retaining groove 68. Preferably, the flexible spline is rectangular in cross-section with the thinner dimension being flexed and curved into the clockwise orientation initiated by the port 28.

Alternatively, insertion of the flexible spline 50 may be prematurely terminated, however, such partial insertion provides less flexible spline material to lock the pipe 60 to the coupling 20. Further, when the spline 50 is only partially inserted, the axial tension is not fully distributed about the coincident retainer grooves 32 and 68, but rather the axial tension is restricted to and carried by only that portion or arc occupied by the flexible spline 50. Note, further, that if the length of flexible spline 50 is known and the length of the coincident grooves 32 and 68 and port 28 are known, then the arc or portion of the flexible spline locking the pipe 60 within the composite coupling 20 may be determined. Once the desired extent of the flexible spline 50 is inserted, a remaining flexible tail or end protrudes from the port 28. This flexible tail may be left or, alternatively and optionally, trimmed to provide a smoother outer profile to the coupled joint.

For a 16" pipe composite coupling, a 0.375" by 0.625" rectangular cross-section flexible spline is preferred. Preferably, a spline length of about 58 inches is employed. The preferred spline is formed of Nylon, preferably Nylon 66. A suitable flexible spline is available from CertainTeed Corporation as part number 86533. Splines can be made by extrusion, injection molding, compression molding, sheet extrusion or molding followed by die cutting or slitting, or by other methods known in the art.

As shown in FIG. 3b, an alternative construction of the coupling 20 is also available. In this preferred alternative embodiment, a snap ring 136 of FIG. 3b replaces the integral pipe stop 36 of the first embodiment shown in FIG. 3a. The snap ring 136 may be positioned and bonded into the central position thereby replacing pipe stop 36. A suitable snap ring 136 may be prepared from a plastic pipe segment of appropriate dimension and having a wide longitudinal cut in a wall of the plastic pipe segment. As indicated in FIG. 3b by the stippling included with the thermoset cross-section, the plastic pipe segment may be a filament-wound pipe. Alternatively, PVC or filled PVC or many other suitable materials, including thermoset or thermoplastic polymers, might be the source for a snap ring 136. The longitudinal cut allows for a slight resilient compression to allow the snap ring 136 to be inserted within the interior surface 34 and positioned before bonding. Most preferably, a shallow snap ring receiver groove 138 is machined in the interior surface 34 to facilitate positioning of the snap ring 136. Snap ring receiver groove 138 also provides a mechanical means of securing the snap ring 136 in place as well as a bonding location with greater surface area for adhesive bonding of the snap ring to the interior of the coupling. A preferred adhesive is epoxy. Preferably, the snap ring outer diameter is slightly larger than the inside diameter of the snap ring receiver groove into which it will be installed. Preferably, the snap ring receiver groove does not extend radially outward further than the O-ring groove into the wall of the coupling. A shallower receiver groove is generally preferred over a deeper receiver groove, thereby avoiding any un-needed weakening of the coupling wall and avoiding any un-needed excess machining. The segment length of the snap ring 136 is about 0.5 inches to about 2.0 inches, preferably about 1.4 inches. Most preferably, the pipe, which is the source of the snap ring 136, is a filament wound pipe of epoxy resin.

The Composite Material of the Coupling.

Figure 4:
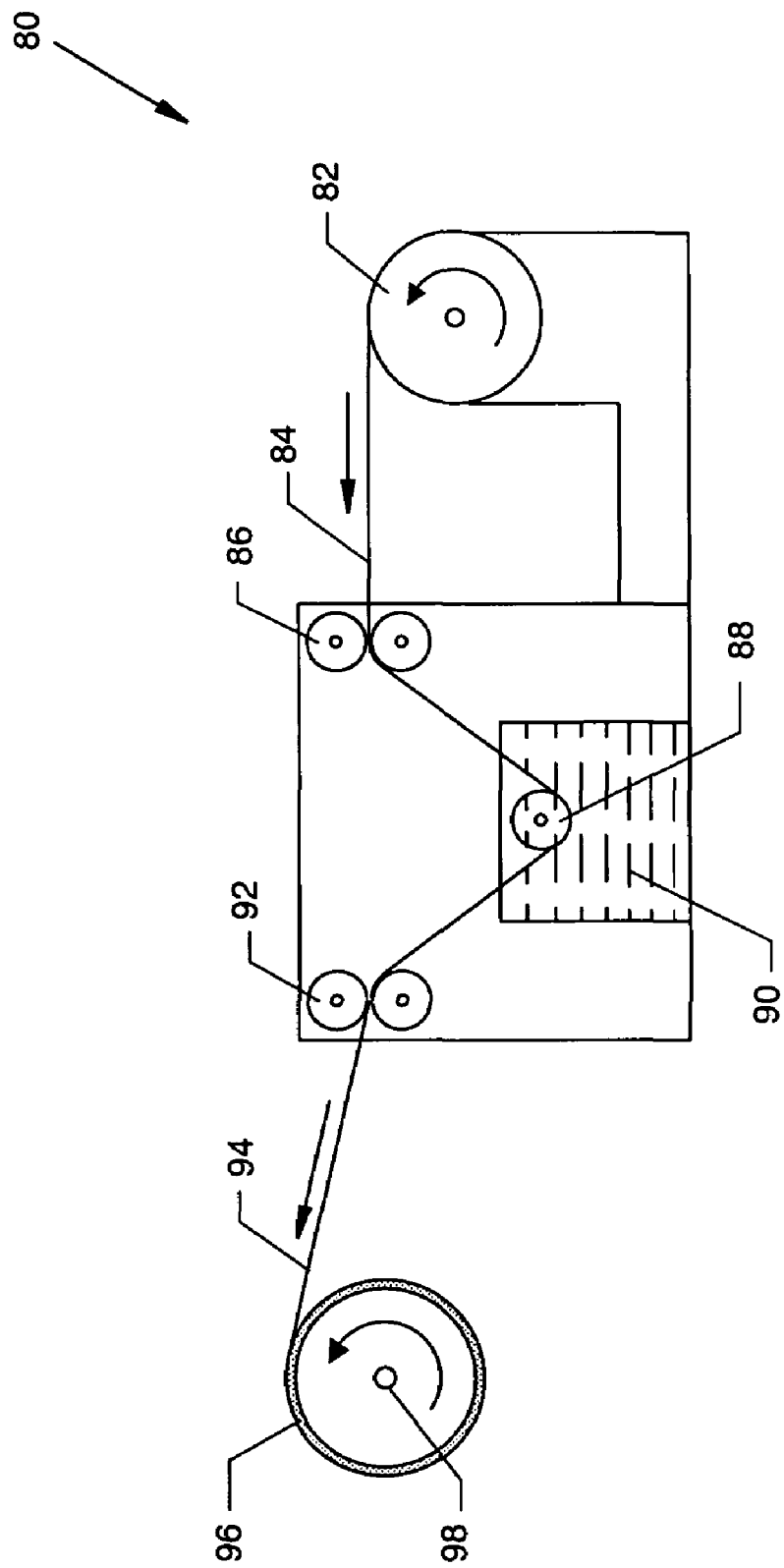
FIG. 4 illustrates a schematic representation of an end view of an embodiment of the present invention being manufactured in a typical fiber winding device.
Figure 5:
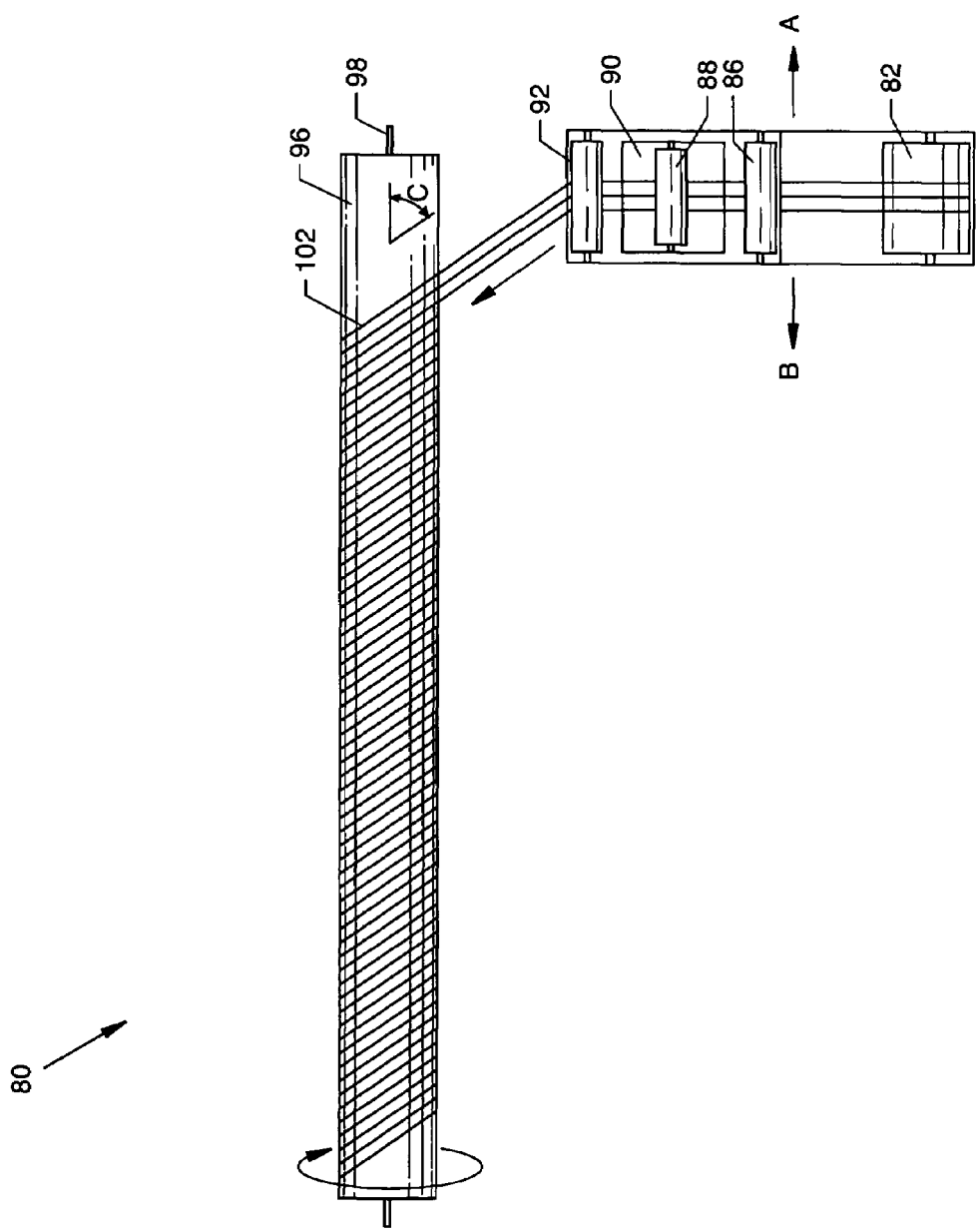
FIG. 5 illustrates a plan view of the schematic representation of FIG. 4.
Figure 6:
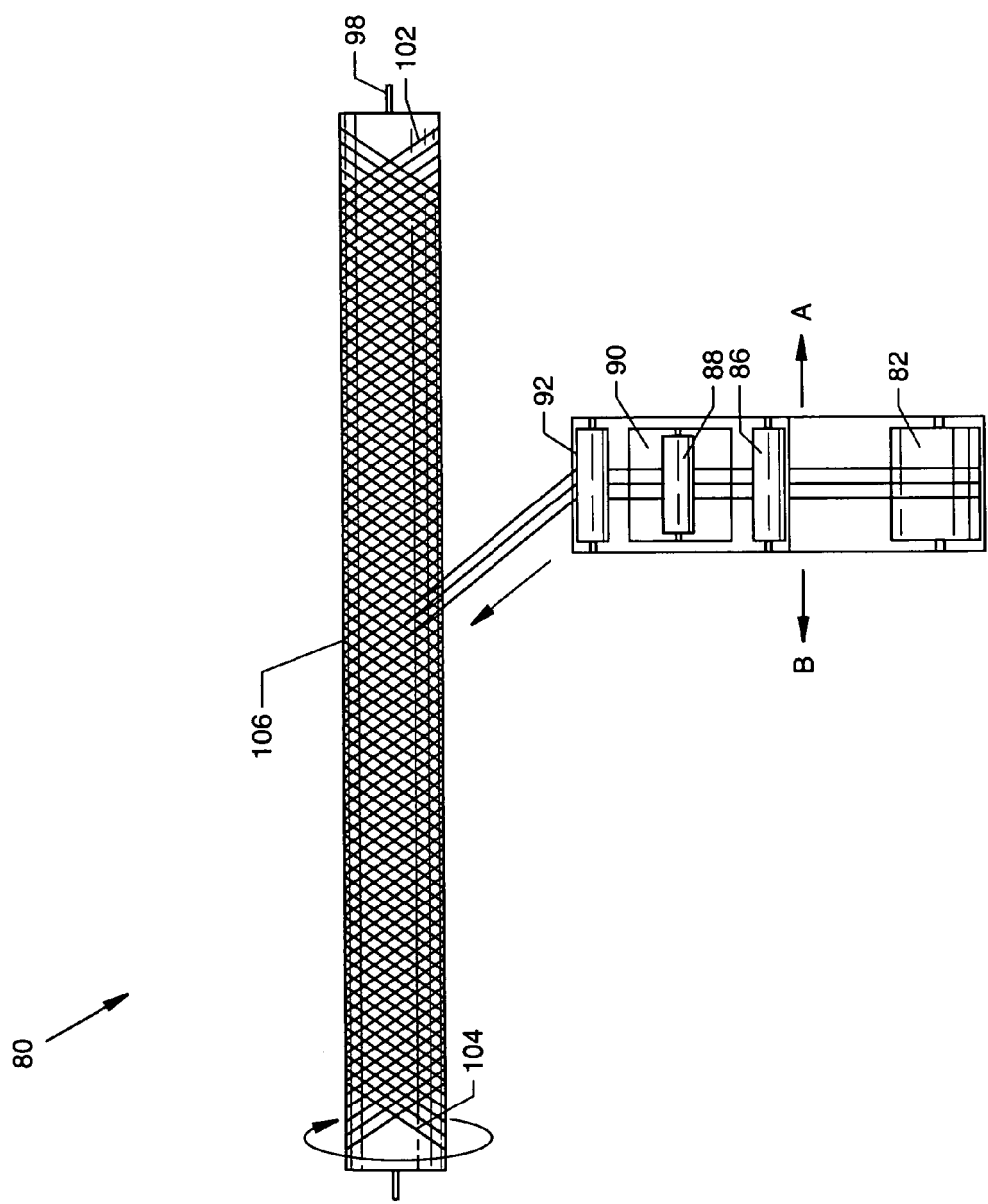
FIG. 6 illustrates the plan view of FIG. 5 during a subsequent stage of manufacture.

FIGS. 4, 5 and 6 schematically illustrate some of the steps in the manufacture of composite coupling 20. In FIG. 4, a filament winding arrangement is schematically illustrated at 80. A supply of filaments on one or more reels or spools 82 is provided as a starting point from which dry filaments are dispensed. The tow 84 of these dry filaments travels to and through a nip 86 and then passes through a resin bath 90 to be wetted by the resin. A roller guide 88 assures that the filaments immerse in the resin bath 90. The resin bath contains thermosetable plastic resin. Subsequent hardening or polymerization of the resin is either by a catalyst added to bath 90, but which has not completely polymerized the resin, or by other means known in the industry. A wet nip 92 controls the tension of the wet tow 94. Wet nip 92 also meters appropriate amounts of uncured resin onto the filaments. Optionally, a comb (not shown) may be present to help maintain order in the resin-wetted filaments of the wet tow 94. The wetted filaments of the wet tow 94 are then wound about a mandrel 96 that is rotating about axle 98. The axle 98 defines an axis for the cylindrically shaped composite coupling being formed on the mandrel 96.

As shown schematically in the plan view FIG. 5, as mandrel 96 rotates about axle 98, resin wetted filaments forming an innermost layer 102 are wound about the mandrel 96 at an angle "C" to the axle 98 and axis of the cylindrical composite coupling being formed as the wet nip 92 moves parallel to the longitudinal axis defined by axle 98 in direction A. Alternatively, the mandrel could traverse the longitudinal axis defined by axle 98 relative to a stationary wet nip 92. For purposes of illustration in FIGS. 5 and 6, three filaments are illustrated. It should be understood that the manufacturing of the composite could be accomplished with a single filament or a plurality of filaments being wound at the same time. In practice, it is preferred that the filaments are wound upon the mandrel 96 such that a filament is in contact with the adjoining winding of the layer, whether the same filament or another member of the plurality of filaments in the layer. This angle "C" is a function of the rate of rotation of the mandrel as well as movement/offset of the wet nip 92 relative to the mandrel 96. Relative movement/ offset of the wet nip 92 in direction "A" produces an angled winding on the mandrel of angle "C" and relative movement of the wet nip 92 in direction "B" produces windings angled in an opposite orientation layer 104 as illustrated in FIG. 6. In a preferred embodiment, an initial layer of angled windings 102 is covered by a layer of angled windings 104 which are angled in an opposing direction, which are covered in turn by a third layer 106 angled in the same manner as initial layer 102. Preferably, at least five layers of alternating angle, angled wound filament or filaments, also sometimes referred to a "tow" are employed in a thermoset matrix. More preferably, at least six layers of angled windings are formed upon mandrel 96 and most preferably at least seven layers are wound upon the mandrel for making a high pressure composite coupling 20. When subsequently cured and consolidated, each layer contributes about 0.083 inches to wall thickness, thereby forming a cylindrical wall of about 0.581 inches in thickness. It should be noted that an exceptionally strong coupling can be formed by adding even more layers of alternating windings, in particular, preferably 8 layers, more preferably 9 layers and most preferably 10 layers of alternating windings to form a cylindrical wall thickness of about 0.830 inches in thickness.

Preferably, the windings of the filaments form angles of from about 40° to about 65°, more preferably from about 45° to about 60° and most preferably about 55° relative to the mandrel axle. As a general guide, it should be noted that when selecting an angle, lower pressures are more compatible with lower winding angles such that about a 45° with respect to the axle 98 of the mandrel 96 produces composite couplings satisfactory for lower pressures. Whereas higher angles tend to produce more axial strength in the resulting coupling, tests of composite couplings formed of windings of 45° with respect to the axis failed to withstand hoop expansion at high internal test pressures. Such experimental couplings tended to fail by developing cracks at higher pressures. A 55° winding angle, relative to axis or axle 98, is a commonly available setting on many filament winding machines. Testing at a 55° winding angle of filament relative to the axis produced a highly effective coupling. Filament winding services, including custom order winding services, are commercially available and one suitable source of such services is Polygon Corporation of Walkerton, Ind.

Alternatively, filament winding arrangements that provide a braided wound filament orientation are known and believed to be useful in forming a wound-filament composite coupling. If a braided wound filament coupling in a thermoset resin matrix were made, similar considerations of winding angle and layers of braid would be expected to apply to the resulting coupling. Also, fiber braiding lends itself to the ability to make complex shapes from braided composites. Thus, fiber braiding might be employed to not only produce cylindrical shaped composites, leading in turn to braided filament-wound composite couplings for assembly of a restrained joint for two co-aligned pipes, but also might be used to prepare other more complex shapes with one, two or more connections for pipes, such as, for example, L-, Y-, or T-, or other shaped couplings and vessels or other articles with receivers having braided filaments which are wound in layers.

Preferably, the filament or filaments used are rovings of glass fibers, particularly continuous rovings, such as E-glass available from Owen Corning or VetroTex. Other filaments which might prove useful in forming a filament wound alternating layer structure from which to make the composite coupling of this invention include Kevlar fiber based materials, available from DuPont, and carbon fiber, although such alternative materials may be cost prohibitive for this application.

The preferred thermoset resin is an epoxy resin, most preferably a bisphenol-A based epoxy. When cured this resin forms a suitably strong matrix binder in the resulting composite material. Alternative thermoset resins that might be employed are vinyl ester based resins used in place of the epoxy matrix binder in the composite. Suitable catalysts are available and known in the filament winding industry.

After winding, the layers of angled wound wetted filaments 102, 104, 106, n−1, n, (etc.) are cured. The resulting cylindrical alternately angle wound composite is cut into segments of a desired length. For a 16 inch pipe coupling, a segment of about 18 inches is preferred. While a single segment may be wound with considerable discarded waste at each end, production efficiency may be promoted by producing longer windings that can yield a number of successive segments but still discard waste materials on the two ends. In this case, windings of about 20 feet in length are preferred and are well within the capabilities of many commercial winding shops. Such lengths can yield about 12 segments and two waste ends. Machining is performed on the interior surface to provide the earlier described structures. If exterior end bevels are to be provided, they are also machined at this time. This interior surface machining includes either the pipe stop 36, or alternatively, the receiver pocket 138 for the snap ring 136. Machining also forms the O-ring grooves 38 and 42, and most importantly, the retainer grooves 32 and 44. If a snap ring 136 is being utilized, it is positioned and adhesively bonded in position after machining.

Alternatively, a collapsible shaped mandrel might be used during the angled filament winding process, which mandrel incorporates expansive features to simultaneously form either O-ring grooves, retainer grooves or a pipe stop or a snap ring recess or all of these internal features of the coupling 20 during winding. In such a manufacturing the mandrel is subsequently removed from the work piece and only the step of finishing the ends of a segment and drilling of ports 28 and 30 remains.

Additionally, ports 28 and 30 are formed, preferably by drilling or boring a tangentially directed aperture from the exterior surface 22 to the retainer grooves 32 and 44. Recall that the ports preferably lead to a clockwise or counterclockwise oriented pathway, when viewed from the associated end of the coupling. Moreover, the filament-wound composite coupling of the present invention preferably should be symmetrical and the ports should be co-aligned with each other.

Subsequently, but prior to use in assembly of a coupled joint, O-rings are placed in O-ring grooves 38 and 40. Preferably, the O-rings are installed in the field, immediately before insertion of a pipe.

Pipe systems installed using the coupling may be safely rated for pressures of 160 psi or more with pipe diameters as large as 16 inches outside diameter or more, more preferably, for pressures of 200 psi or more. Tensile load of the assembled pipe joint is preferably greater than about 125,000 pounds and more preferably greater than about 135,000 pounds for 16 inch pipe systems. In the oil industry, pipe systems of 36 inch outer diameter or more are occasionally employed and it is believed that the present invention is also useful for such systems.

Flow rates in installed piping systems of 16" outside diameter can be as high as 2500 gallons per minute calculated at a velocity of 5 feet/sec, preferably greater than 2600 gallons per minute. It should be recognized that while the coupling of this invention is especially suitable to PVC pipe, it could also provide utility in forming restrained joints with other types of pipes, including plastic pipes and metallic pipes. However, it should be recognized that to assemble a restrained joint requires that the pipes to be joined have a complementary retainer groove.

Exposure to extended high internal pressure for as long as 1000 hours indicates that the filament-wound composite coupling does not fail over time and exposure to rapid internal pressure similarly indicates that the composite coupling is satisfactorily resistant to such shocks.

In one test series employing very high pressure, a 16 inch pipe and filament-wound composite coupling in a joint were exposed to 420 psi internal pressure, thereby generating an end thrust of about 84,000 pounds. In this test, it was observed that a smaller ⅜ inch by ⅜ inch square cross-section nylon spline failed slowly over time but that a preferred ⅝ inch by ⅜ inch rectangular cross-section nylon spline withstood over 1000 hours of this test.

Axial testing results indicated that the coupling when assembled into a joint with PVC pipe can reach tensile loading of 125,000 pounds for the seven alternating layer embodiment and 138,000 pounds in the ten alternating layer embodiment. Additionally, the coupling passed the ASTM D4060 abrasion test. The UV resistance of the coupling is acceptable for 2000 hours. For longer UV exposure tests of, for example, 12,000 or more hours, it is advisable to provide an external UV protective coating such as a two part polyurethane based protective coating, such as a Carbit brand two part urethane coating, available from the Carbit Paint Company of Chicago, Ill. Application of such a two part polyurethane based protective coating also unexpectedly and favorably imparts an improved abrasion resistance to the wound-filament composite coupling. Such improved abrasion resistance is an advantage for certain alternate uses of the fiber-wound composite coupling such as directional drilling in which restrained joints assembled with PVC pipe and fiber-wound-coupling are pulled through the earth. The ability to use easily and quickly assembled joints allows readily handled lengths of pipe to be used in directional drilling operations, thereby avoiding the additional space and safety requirements necessary for bulky reels of continuous pipe or long strings of pre-assembled pipe systems. The coupling of the present invention may also be useful in smaller diameter pipe systems used in directional drilling. The coupling would provide joints with improved axial strength and increased lengths of pipe could be pulled through the earth at any given time. This invention, therefore, would allow greater depth and/or distances to be achieved in directional drilling applications. The filament-wound composite coupling and a joint assembled therefrom are particularly useful for underground water mains, most particularly high pressure underground water mains in potable water distribution systems. It may also be used in sewer systems for either gravity collection mains or for force mains. It also may be used as a carrier pipe within a casing.

A Burst Pressure test under ASTM D2241-00, modified to employ 10 minutes to reach a pressure of 630 psi, was performed and the coupling passed. In this test, the greater time to achieve test pressure was required due to the large volume in the coupling. An additional use of the composite coupling of the present invention is made possible by the remarkable increase in axial strength in restrained joints employing the composite coupling. In particular, 16" PVC pipe joined by the coupling of the present invention is now capable of being pulled at far greater tension than previously thought possible. It should be noted that the end bevels 25 and 27 of the coupling serve to reduce tension by allowing rocks and other rigid obstacles to be passed by a pipe string employing restrained joints with coupling of the present invention. This development allows use of 16" PVC pipes with joints employing the inventive coupling to be pulled underground by directional drilling rigs and similar applications. This allows installation of large 16 inch PCV water distribution pipe systems, including a plurality of joints, under roadways and such without interrupting traffic and without destroying the roadway surface. Previously, such systems utilized either continuous plastic pipe systems with large coils of pipe and the associated difficulties of handling such large coils or alternatively required space for several hundred feet of pre-assembled pipe systems.

The concepts of the present invention with respect to preparing a composite coupling are applicable to other variants of restrained couplings that accept flexible insertion splines and various designs of flexible insertion splines. For example, couplings employing splines which are non-circumferentially directed, in particular helically directed splines, and multiple spline restraining systems may benefit from the present invention. Alternative O-ring arrangements, such as O-rings situated adjacent the bevel of the pipe end, may benefit from the present invention. Coupling systems employing spline handling devices, whether separate from or integral to the flexible spline, for facilitating insertion or removal of a spline may benefit from the present invention.

Figure 7:
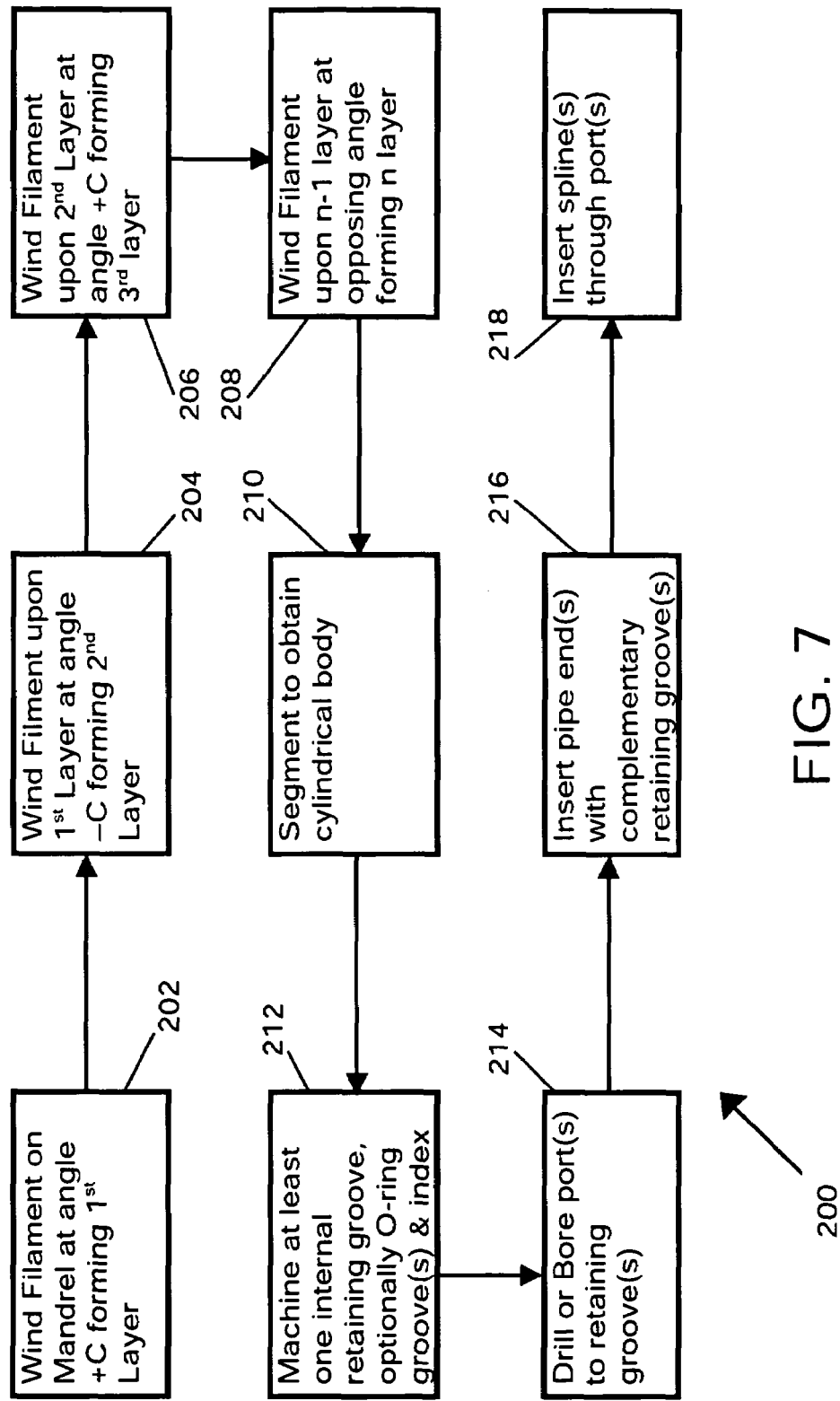
FIG. 7 is a flow chart of steps in forming a coupling and subsequently steps of forming a restrained joint.
Figure 8:
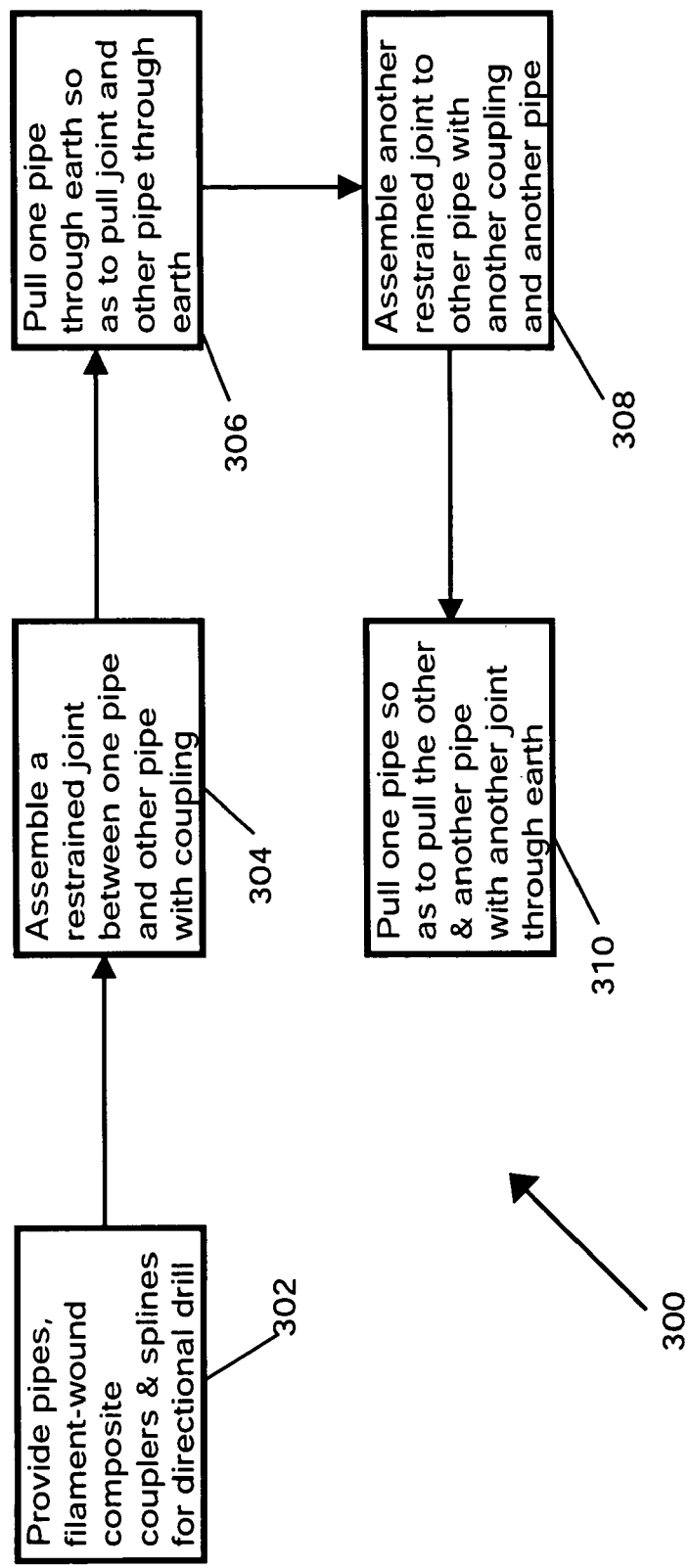
FIG. 8 is a flow chart of steps in directional drilling with couplings of the present invention.

As shown at 200 in FIG. 7, the present invention, in other embodiments is a method of making a coupling and subsequently using the coupling to connect to pipe or pipes to assemble a restrained joint. A wetted filament is wound on a mandrel 202 to form a first layer with angle C. Wetted filament is wound 204 upon the first layer at an angle −C which opposes the first angle C. A third opposing angle is wound upon the second 206. The layered winding with opposing angles is continued 208 until the n layer is wound. The resulting article is segemented 210 and machined 212. A port for each retainer groove is bored or drilled 214. The coupling can assemble into a restrained joint by inserting a pipe end 216 and then inserting a spline 218 to lock the pipe end. As shown in FIG. 8, the coupling can be used in direction drilling 300. Pipes, couplings of the invention and splines are provided 302. One pipe, attached to the drilling equipment is set to pull through the earth. An other pipe is coupled in a restrained joint to the one pipe 304. The one pipe is pulled through the earth and the other pipe is pulled via the restrained joint behind the one pipe 306. Another pipe is coupled to the other pipe's remaining end 308. This another pipe is then pulled through the earth in succesion behind the one pipe and the other pipe 310. Additional pipes are coupled and then pulled in a similar manner.

Those of ordinary skill will now recognize that the fiber-wound coupling of present invention is a significant advance in this field at least because the present invention provides a better restrained joint between pipes with complementary retaining grooves, especially PVC pipes of 16 inch or greater outside diameter. Restrained joints employing the fiber-wound coupling of the present invention are readily assembled and stronger in both ability to handle higher internal pressures and in axial strength. These two characteristics allow for higher pressures in large diameter PVC pipe systems as well as allowing new uses for coupled PVC pipes, such as well casing or directional drilling. Those of ordinary skill will further recognize that various modifications can be made to the present invention without departing from the spirit of the invention.

I claim:

1. A composite coupling for use in assembling a restrained joint between a plurality of pipes having pipe ends and external complementary restraining grooves axially spaced from the pipe ends, the composite coupling comprising:
   a cylindrical composite body, the cylindrical composite body defining an axis and having a first end, a second end, an exterior surface and an interior surface;
   a first retainer groove in the interior of the coupling, the first retainer groove being axially spaced from the first end;
   a first port, the first port communicating between the exterior surface and the first retainer groove;
   a second retainer groove in the interior of the coupling, the second retainer groove being axially spaced from the second end;
   a second port, the second port communicating between the exterior surface and the second retainer groove; and,
   wherein the cylindrical composite body comprises a plurality of concentrically arranged layers of wound filaments in a thermoset plastic matrix, each of the layers characterized by a winding angle opposing the winding angle of the adjoining layers and wherein the winding angle is front 40 degrees to 65 degrees and the opposing winding angle is from −40 degrees to −65 degrees.

2. The composite coupling of claim 1 and wherein the coupling further comprises:
   means for sealing the pipes in a restrained joint to maintain a pressurized flow between the pipes through the restrained joint.

3. The composite coupling of claim 2 and wherein the means for sealing the pipes includes providing a seal between each pipe and the interior surface of the coupling.

4. The composite coupling of claim 1 and further comprising:
   means to index a first pipe end so as to position a first complementary retainer groove coincident with the first retainer groove.

5. The composite coupling of claim 4 and further comprising:
   means to index a second pipe end so as to position a second complementary retainer groove coincident with the second retainer groove.

6. The composite coupling of claim 5 and wherein the means to index the first complementary retainer groove with the first retainer groove is a pipe stop, the pipe stop limiting the depth of insertion of the first pipe into the first end of the composite coupling.

7. The composite coupling of claim 5 and wherein the means to index the second complementary retainer groove with the second retainer groove is a pipe stop, the pipe stop limiting the depth of insertion of the second pipe into the second end of the composite coupling.

8. The composite coupling of claim 1 and wherein the first port is tangential to the first retainer groove.

9. The composite coupling of claim 1 and wherein the retainer grooves are circumferentially arranged about the axis of the cylinder.

10. The composite coupling of claim 1 and wherein the pipes to be coupled have an outer diameter of about 16 inches.

11. The composite coupling of claim 1 and wherein the coupling has at least five layers of opposing windings.

12. The composite coupling of claim 11 and wherein the coupling has seven or more layers of opposing windings.

13. The composite coupling of claim 1 and wherein the filaments are glass filaments.

14. The composite coupling of claim 1 and wherein the thermoset matrix is epoxy.

15. The composite coupling of claim 4 and wherein the means for indexing is a snap ring.

16. The composite coupling of claim 15 and wherein the snap ring is bonded to the interior surface.

17. A composite coupling for use in assembling a restrained joint between a plurality of pipes having pipe ends and external complementary restraining grooves axially spaced from the pipe ends, the composite coupling comprising:
   a cylindrical composite body, the cylindrical composite body defining an axis and having a first end, a second end, an exterior surface and an interior surface;
   a first retainer groove in the interior of the coupling, the first retainer groove being axially spaced from the first end;
   a first port, the first port communicating between the exterior surface and the first retainer groove;
   a second retainer groove in the interior of the coupling, the second retainer groove being axially spaced from the second end;
   a second port, the second port communicating between the exterior surface and the second retainer groove; and,
   wherein the cylindrical composite body comprises a plurality of concentrically arranged layers of wound filaments in a thermoset plastic matrix, each of the layers characterized by a winding angle opposing the winding angle of the adjoining layers and wherein the filaments in a first layer of the composite are disposed upon a winding angle of about +55 degrees relative to the cylindrical axis.

18. The composite coupling of claim 17 and wherein the filaments in a second layer wound over the first layer are disposed upon a winding angle of about −55 degrees relative to the cylindrical axis.

19. A method of assembling a restrained joint comprising the steps of:
   providing a filament-wound composite coupling having a first end with a first retaining groove and a first port communicating with the first retaining groove, and a second end with a second retaining groove and a second port communicating with the second retaining groove wherein the filament-wound composite coupling comprises a plurality of concentrically arranged layers of wound filaments in a thermoset plastic matrix, each of the layers characterized by a winding angle opposing the winding angle of the adjoining layers, and wherein the winding angle is from 40 degrees to 65 degrees and the opposing winding angle is from −40 degrees to −65 degrees;

providing a first pipe with a first complementary retaining groove and a second pipe with a second complementary retaining groove;

providing a first flexible spline and a second flexible spline;

inserting the first pipe into the first end such that the first complementary retaining groove of the first pipe is coincident with the first retaining groove and subsequently inserting the first flexible spline through the first port and into at least a portion of the coincident first complementary retaining groove and first retaining groove so as to axially lock the first pipe to the coupling; and, inserting the second pipe into the second end such that the second complementary retaining groove of the second pipe is coincident with the second retaining groove and subsequently inserting the second flexible spline through the second port and into at least a portion of the coincident second complementary retaining groove and second retaining groove so as to axially lock the second pipe to the coupling, thereby assembling a restrained joint.

20. The method of claim 19 and wherein the filament-wound composite coupling further includes O-rings to seal the first and second pipes to the coupling.

21. The method of claim 19 and wherein the coupling further includes means for indexing the first and second pipes to facilitate establishing coincident relationships for the complementary retaining grooves relative to the retaining grooves of the coupling.

22. A pipe system comprising:

a plurality of pipes, each of the pipes of the plurality having two ends and an outward directed complementary retainer groove associated with each end;

at least one filament-wound composite coupling, the coupling including two ends, two inwardly directed retaining grooves, each of the retaining grooves having a port communicating with the retaining groove and wherein the filament-wound composite coupling comprises a plurality of concentrically arranged layers of wound filaments in a thermoset plastic matrix, each of the layers characterized by a winding angle opposing the winding angle of the adjoining layers, and wherein the winding angle is from 40 degrees to 65 degrees and the opposing winding angle is from −40 degrees to −65 degrees; and, at least two flexible splines, each spline being insertable into one of the retaining grooves through the associated port to axially lock a pipe end to the coupling by retaining a coincident relationship between the complementary retaining groove and the retraining groove, thereby defining a restrained joint of the pipe system.

* * * * *